(12) United States Patent  
Shapiro

(10) Patent No.: US 12,260,417 B2
(45) Date of Patent: *Mar. 25, 2025

(54) METHOD FOR MANAGING, EVALUATING AND IMPROVING IDENTITY GOVERNANCE AND ADMINISTRATION

(71) Applicant: Costidity, Inc., Bedford, MA (US)

(72) Inventor: Vladislav Shapiro, Bedford, MA (US)

(73) Assignee: Costidity, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,194

(22) Filed: Oct. 10, 2023

(65) Prior Publication Data

US 2024/0037570 A1 Feb. 1, 2024

Related U.S. Application Data

(63) Continuation of application No. 17/209,682, filed on Mar. 23, 2021, now Pat. No. 11,836,742.

(51) Int. Cl.
| | | |
|---|---|---|
| G06F 21/45 | (2013.01) | |
| G06F 16/22 | (2019.01) | |
| G06F 16/28 | (2019.01) | |
| G06Q 30/018 | (2023.01) | |

(52) U.S. Cl.
CPC ..... *G06Q 30/0185* (2013.01); *G06F 16/2264* (2019.01); *G06F 16/285* (2019.01); *G06F 21/45* (2013.01)

(58) Field of Classification Search
None
See application file for complete search history.

(56) References Cited

U.S. PATENT DOCUMENTS

| 10,721,239 B2 | 7/2020 | Koottayi et al. | |
| 2020/0280564 A1* | 9/2020 | Badawy | H04L 63/102 |
| 2022/0300497 A1* | 9/2022 | Pansare | G06N 20/00 |

* cited by examiner

*Primary Examiner* — Nelson S. Giddins
(74) *Attorney, Agent, or Firm* — Bond, Schoeneck & King, PLLC

(57) ABSTRACT

A system and related methods are disclosed for managing, evaluating and improving identity governance and administration. The system is configured to execute a method, which includes receiving, by a computing system, data associated with the identity governance and administration, classifying, by a computing system, the data associated with the identity governance and administration according to one or more rules, generating, by a computing system, a three-dimensional model using the classified data associated with the identity governance and administration, performing, by a computing system, a statistical analysis, and optionally displaying, by a computing system, the three-dimensional model or results of the statistical analysis, or both.

20 Claims, 23 Drawing Sheets

- Exception Go octant: Yes + False + Positive
- Exception Stop octant: Yes + False + Negative

METHOD FOR MANAGING, EVALUATING AND IMPROVING IDENTITY GOVERNANCE AND ADMINISTRATION

TECHNICAL FIELD

Embodiments of the present invention relate generally to methods for managing and securing digital identities, and more specifically to methods and systems for managing, evaluating and improving identity governance and administration (IGA).

BACKGROUND ART

One of the fundamental problems of identity and access governance lies in very unclear relationships between real business needs, access policies and decision making related to allowing certain action on the assets. For years known systems and methods have been trying to develop access policies which at the same time correspond to business expectations, digital security rules and regulations, and people-centric to minimize deviations. There have been many attempts to develop and implement industry best practices and recommendations, promising better resolution, utilizing methodologies of implementing business policies and optimizing them, but practically they are still far away from solving this issue.

For analyzing access requests, the known systems and methods are still using two-dimensional four quadrant model (True Positive, True Negative, False Positive and False Negative) where True/False defines satisfaction of access policies conditions and Positive/Negative shows if access was granted or not. However, this established industry practice is not adequate and effective when it comes to managing, evaluating and improving identity governance and administration. Hence, there is a need for a new approach that solves the described above deficiencies of the prior art systems and related methods.

SUMMARY OF THE EMBODIMENTS

The system of the present invention is configured to use a three-dimensional model having eight octants, adding one more measurement: business need. Its value is "Yes" in case there is a business need for this access, and "No" if there is none. As a result, instead of square or "magic quadrant" we are researching an access governance cube, which can be called the NPR cube, which stands for Needs axis, Policies axis, and Resolutions axis. Needs corresponds to business needs related to the request; Policies corresponds to access policy logic, and Resolution corresponds to the decision to go or not to go.

The system of the present invention is designed to utilize the access governance NPR cube model and related methods, which can help the organization determine necessary adjustments of the policies and their implementation in Identity Governance workflows and processes to improve maturity, decrease risk of breaches, policy deviation by users and cost of managing and enforcing policies hereinafter referred to as Costidity.

A system and related methods are disclosed for managing, evaluating and improving identity governance and administration. The system is configured to execute a method, which includes receiving, by a computing system, data associated with the identity governance and administration, classifying, by a computing system, the data associated with the identity governance and administration according to one or more rules, generating, by a computing system, a three-dimensional model using the classified data associated with the identity governance and administration, and performing, by a computing system, a statistical analysis, and optionally displaying, by a computing system, the three-dimensional model or the results of the statistical analysis, or both. The three-dimensional model can be visualized and displayed as a three-dimensional cube with eight octants. The data associated with the identity governance and administration can include the history of digital assets access requests by each person across the organization and the entitlements that are assigned to each person across the organization. According to some embodiments of the present invention, the step of classifying the data includes taking each digital assets access request and applying the following queries: a) business need, b) compliance with the organization's policy, and c) resolution; assigning at least two discrete values to each query; and, in case of a positive resolution defined as the access request being granted, matching each request with a corresponding one or more entitlements person received as a result of request grant.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
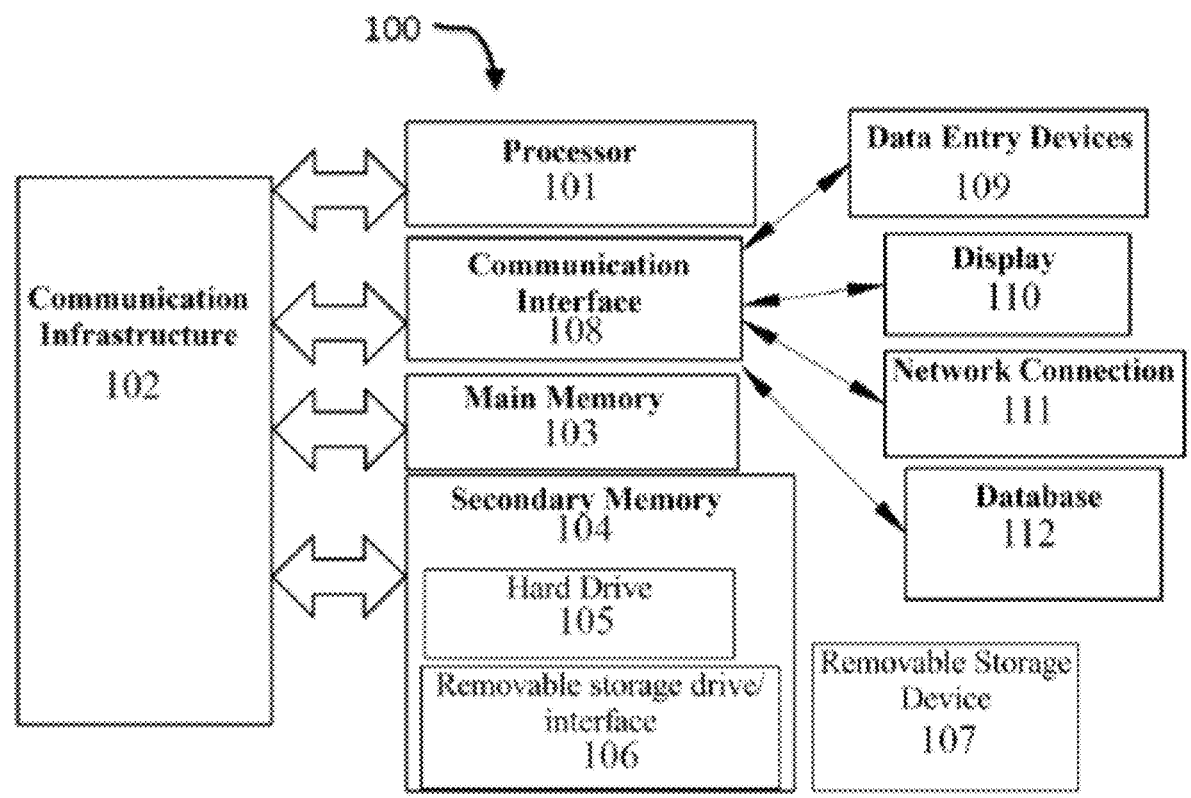
FIG. 1 is a schematic diagram of the kind of electronic device that performs the disclosed method and comprises the disclosed system.

The disclosed invention is a method performed by a computer or similar electronic device, which is configured to build a three-dimensional model to analyze digital access data for managing, improving and correcting identity, government and administration (IGA).

Definitions. As used in this description and the accompanying claims, the following terms shall have the meanings indicated, unless the context otherwise requires:

An "electronic device" is defined herein as including personal computers, laptops, tablets, smart phones, and any other electronic device capable of supporting an application as claimed herein.

A device or component is "coupled" to an electronic device if it is so related to that device that the product or means and the device may be operated together as one machine. In particular, a piece of electronic equipment is coupled to an electronic device if it is incorporated in the electronic device (e.g. a built-in camera on a smartphone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the electronic device by shared membership in some network consisting of wireless and wired connections between multiple machines (e.g. a printer in an office that prints documents to computers belonging to that office, no matter where they are, so long as they and the printer can connect to the internet).

"Data entry means" is a general term for all equipment coupled to an electronic device that may be used to enter data into that device. This definition includes, without limitation, keyboards, computer mouses, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure.

An electronic device's "manual data entry means" is the set of all data entry devices coupled to the electronic device that permit the user to enter data into the electronic device using manual manipulation. This definition includes, without limitation, keyboards, keypads, touchscreens, trackpads, computer mouses, buttons, and other similar components.

An electronic device's "display means" is a device coupled to the electronic device, by means of which the electronic device can display images. This definition includes, without limitation, monitors, screens, television devices, and projectors.

To "maintain" data in the memory of an electronic device means to store that data in any memory coupled to the electronic device in a form convenient for retrieval as required by the algorithm at issue, and to retrieve, update, or delete the data as needed.

A "term" is any string of symbols that may be represented as text on or by an electronic device as defined herein. In addition to single words made of letters in the conventional sense, the meaning of "term" as used herein includes, without limitation, a phrase made of such words, a sequence of nucleotides described by AGTC notation, any string of numerical digits, and any string of symbols whether their meanings are known or unknown to any person.

A "document" may be any collections of terms, as defined above, including books, articles, papers, web pages, and other collections of words in the colloquial sense, the nucleotide sequences of organisms, chromosomes, or plasmids, the amino acid sequences representing proteins, any subsection of any of the preceding examples, and any samples of text or textually representable patterns containing the textual data patterns the user wishes to investigate.

The system and method disclosed herein will be better understood in light of the following observations concerning the electronic devices that support the disclosed application, and concerning the nature of applications in general. An exemplary electronic device is illustrated by FIG. 1. The processor 200 may be a special purpose or a general-purpose processor device. As will be appreciated by persons skilled in the relevant art, the processor device 200 may also be a single processor in a multi-core/multiprocessor system, such system operating alone, or in a cluster of computing devices operating in a cluster or server farm. The processor 200 is connected to a communication infrastructure 201, for example, a bus, message queue, network, or multi-core message-passing scheme.

The electronic device also includes a main memory 202, such as random access memory (RAM), and may also include a secondary memory 203. Secondary memory 203 may include, for example, a hard disk drive 204, a removable storage drive or interface 205, connected to a removable storage unit 206, or other similar means. As will be appreciated by persons skilled in the relevant art, a removable storage unit 206 includes a computer usable storage medium having stored therein computer software and/or data. Examples of additional means creating secondary memory 203 may include a program cartridge and cartridge interface (such as that found in video game devices), a removable memory chip (such as an EPROM, or PROM) and associated socket, and other removable storage units 206 and interfaces 205 which allow software and data to be transferred from the removable storage unit 206 to the computer system.

The electronic device may also include a communications interface 207. The communications interface 207 allows software and data to be transferred between the electronic device and external devices. The communications interface 207 may include a modem, a network interface (such as an Ethernet card), a communications port, a PCMCIA slot and card, or other means to couple the electronic device to external devices. Software and data transferred via the communications interface 207 may be in the form of signals, which may be electronic, electromagnetic, optical, or other signals capable of being received by the communications interface 207. These signals may be provided to the communications interface 207 via wire or cable, fiber optics, a phone line, a cellular phone link, and radio frequency link or other communications channels. The communications interface in the system embodiments discussed herein facilitates the coupling of the electronic device with data entry devices 208, which can include such manual entry means 209 as keyboards, touchscreens, mouses, and trackpads, the device's display 210, and network connections, whether wired or wireless 213. It should be noted that each of these means may be embedded in the device itself, attached via a port, or tethered using a wireless technology such as BLUETOOTH®.

Computer programs (also called computer control logic) are stored in main memory 202 and/or secondary memory 203. Computer programs may also be received via the communications interface 207. Such computer programs, when executed, enable the processor device 200 to implement the system embodiments discussed below. Accordingly, such computer programs represent controllers of the system. Where embodiments are implemented using software, the software may be stored in a computer program product and loaded into the electronic device using a removable storage drive or interface 205, a hard disk drive 204, or a communications interface 207.

Persons skilled in the relevant art will also be aware that while any device must necessarily comprise facilities to perform the functions of a processor 200, a communication infrastructure 201, at least a main memory 202, and usually a communications interface 207, not all devices will necessarily house these facilities separately. For instance, in some forms of electronic devices as defined above, processing 200 and memory 202 could be distributed through the same hardware device, as in a neural net, and thus the communications infrastructure 201 could be a property of the configuration of that particular hardware device. Many devices do practice a physical division of tasks as set forth above, however, and practitioners skilled in the art will understand the conceptual separation of tasks as applicable even where physical components are merged.

Figure 2:
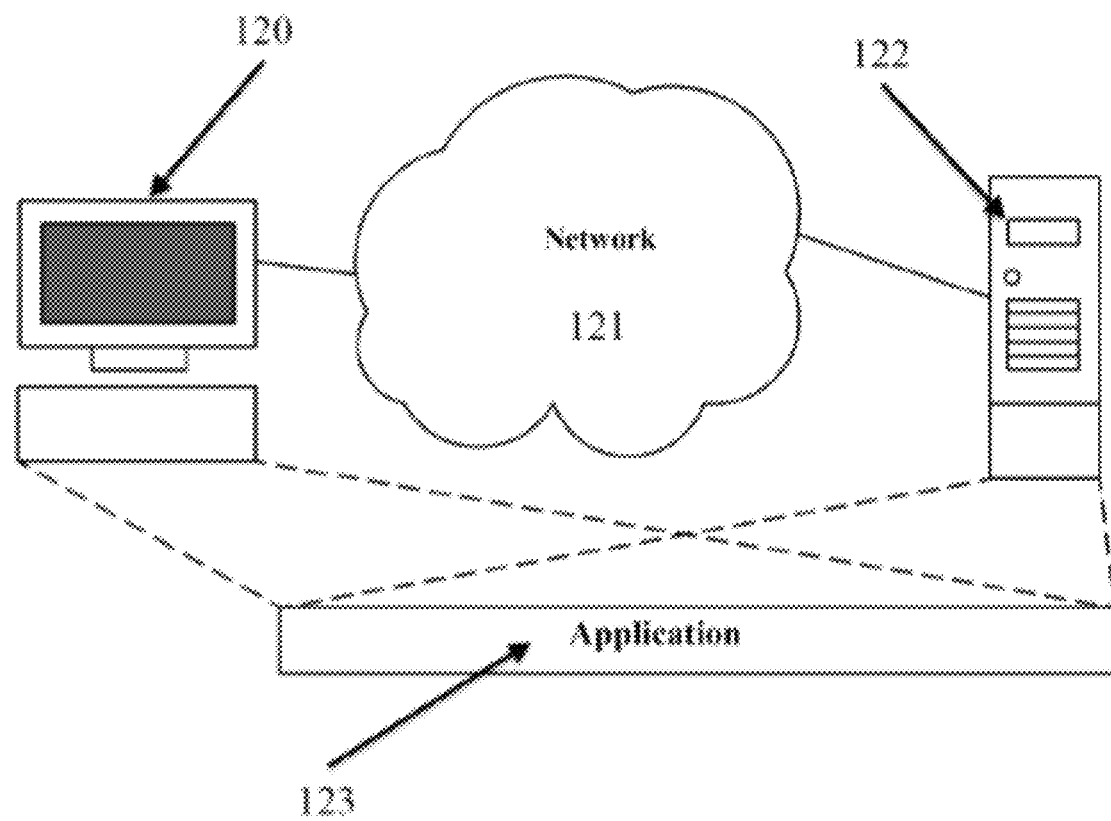
FIG. 2 is a schematic diagram illustrating the disclosed system and depicting a typical web application deployment.

This invention could be deployed in a number of ways, including on a stand-alone electronic device, a set of electronic devices working together in a network, or a web application. Persons of ordinary skill in the art will recognize a web application as a particular kind of computer program system designed to function across a network, such as the Internet. A schematic illustration of a web application platform is provided in FIG. 2. Web application platforms typically include at least one client device 300, which is an electronic device as described above. The client device 300 connects via some form of network connection to a network 301, such as the Internet. Also connected to the network 301 is at least one server device 302, which is also an electronic device as described above. Of course, practitioners of ordinary skill in the relevant art will recognize that a web application can, and typically does, run on several server devices 302 and a vast and continuously changing population of client devices 300. Computer programs on both the client device 300 and the server device 302 configure both devices to perform the functions required of the web application 304. Web applications 304 can be designed so that the bulk of their processing tasks are accomplished by the server device 302, as configured to perform those tasks by its web application program, or alternatively by the client device 300. However, the web application must inherently involve some programming on each device.

Many electronic devices, as defined herein, come equipped with a specialized program, known as a web browser, which enables them to act as a client device 300 at least for the purposes of receiving and displaying data output by the server device 302 without any additional programming. Web browsers can also act as a platform to run so much of a web application as is being performed by the client device 300, and it is a common practice to write the portion of a web application calculated to run on the client device 300 to be operated entirely by a web browser. Such browser-executed programs are referred to herein as "client-side programs," and frequently are loaded onto the browser from the server 302 at the same time as the other content the server 302 sends to the browser. However, it is also possible to write programs that do not run on web browsers but still cause an electronic device to operate as a web application client 300. Thus, as a general matter, web applications require some computer program configuration both of the client device (or devices) 300 and the server device 302 (or devices). The computer program that comprises the web application component on either electronic device's system FIG. 1 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Finally, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Figure 3:
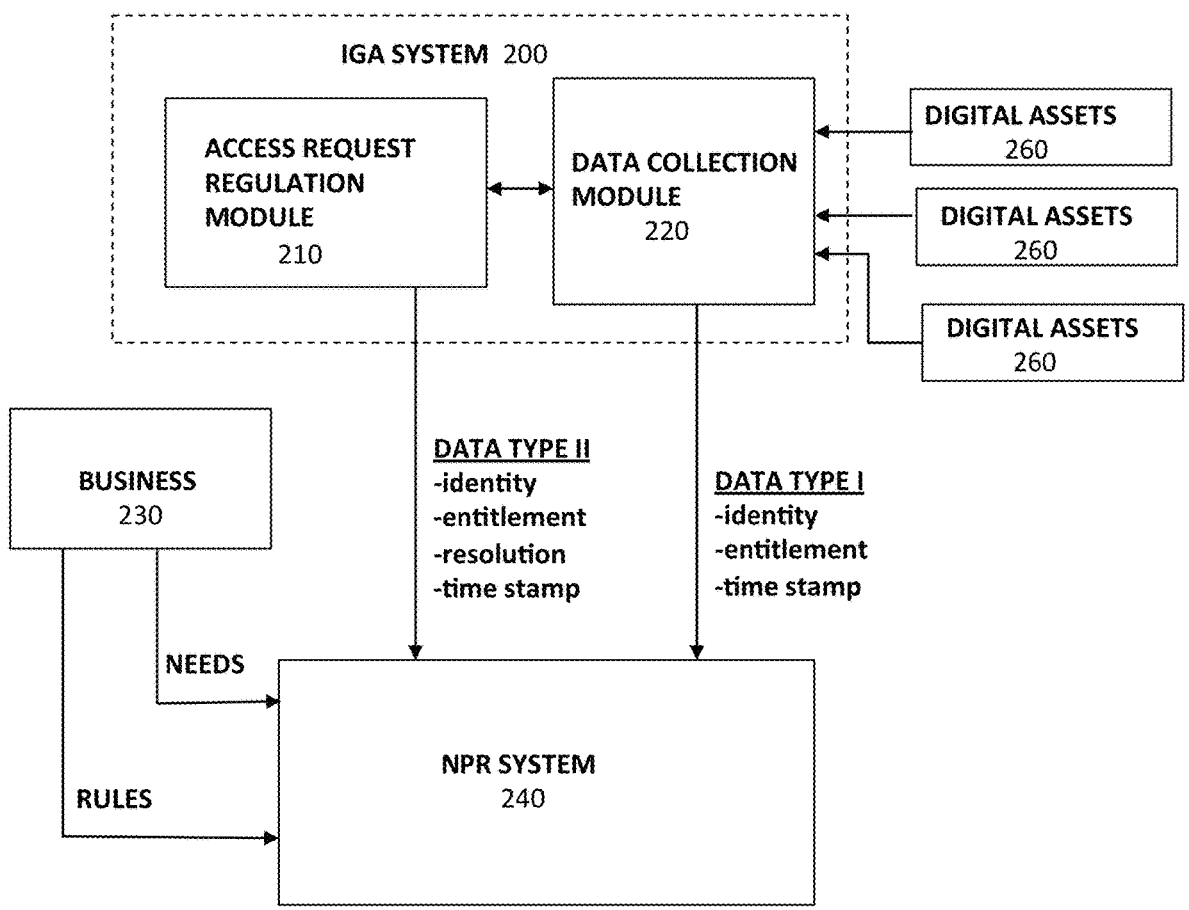
FIG. 3 is a schematic diagram illustrating the disclosed system of the present invention in relation to the flow of data utilized by the system for IGA management.

As illustrated in FIG. 3 exemplary data flow diagram, the NPR system 240 of the present invention is in communication with identity governance administration (IGA) platform 200 having data collection module 220 and access request regulation module 210 and with at least one business entity 230. Type I data associated with digital assets 260 includes identity, entitlement and time stamp categories and is collected by the data collection module 220 and transmitted to the NPR system 240 for processing. Type II data associated with digital assets 260 includes identity, entitlement, resolution, and time stamp categories and is collected by the access request regulation module 210 and transmitted to the NPR system 240 for processing. In addition, the NPR system 240 is configured to receive from one or more business entities 230 data characterized as "needs" and "rules" associated with business needs and business rules defined by the business entity. This data collected by the NPR system 240 of the present invention is used to build a three-dimensional model and perform statistical analysis to manage, evaluate and correct or improve the identity governance administration (IGA) platform as described in detail below.

Figure 4:
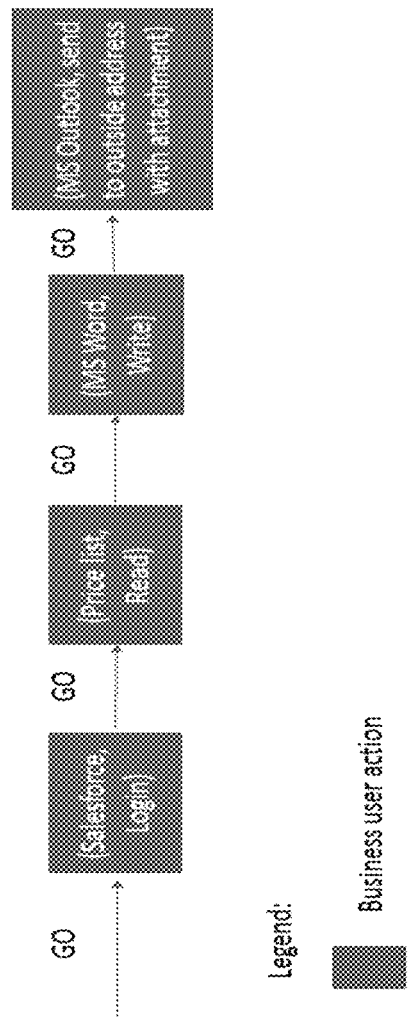
FIG. 4 is a workflow diagram illustrating a simple user process chain utilized by various businesses.
Figure 5:
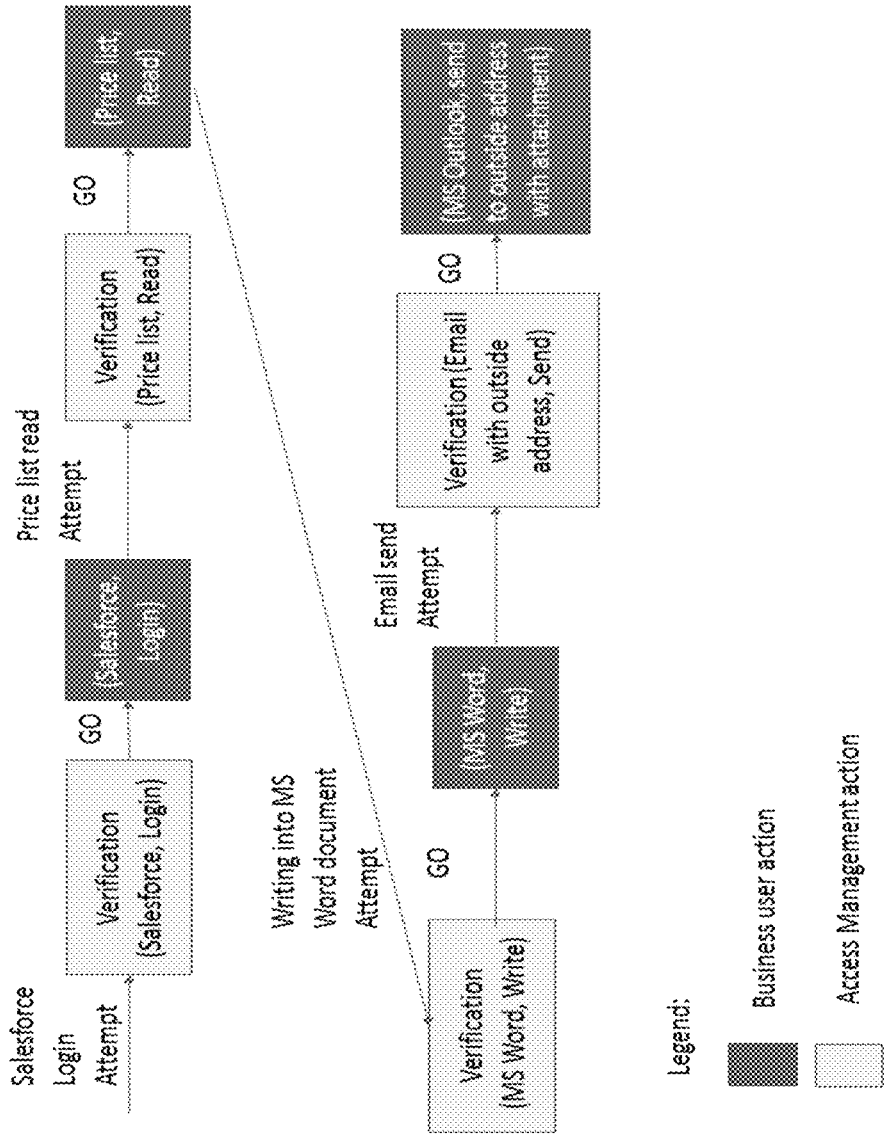
FIG. 5 is a workflow diagram illustrating the user process chain of FIG. 3 but with implemented access controls.

Referring now to FIGS. 4-5 illustrating a user process chain, it should be noted that every user in the organization is working on certain tasks, and each task could require a specific action on the company assets. For example, sales account manager is working on the proposal to a prospect and needs information from the price list. To get it, a person has to access Salesforce, copy and paste catalog items, insert them into the document and email it to the client. From operations stand point, there are four distinct actions: logging into Salesforce, read data from it, write data to the proposal document and email the document as illustrated in FIG. 4. It is called the user process chain with four steps in the relevant art of the IGA, wherein each step is not just an action but rather an action on the specific asset that can be defined as an Asset-Action pair.

However, once the access governance, access controls, cybersecurity policies and other various operational rules are implemented, the user process chain can be expanded by adding access request processings, as illustrated in a diagram of FIG. 5. As can be understood from the cyber security standpoint, each step requires access request processing of its legitimacy before allowing action to happen. This diagram contains only one case when access request processing results in "GO". In real life, it could be "GO" or "STOP" and then requester needs more steps to mitigate "STOP".

The user process chain with access controls as shown in FIG. 5 is more complicated, and since efficiency is measured in how much time does it take to finish the process, a business entity would eventually ask if additional access controls steps make sense. This requires identity and IT Security personnel to produce some kind of measurements supporting new user process chain. Usually, it comes to risk calculation and closing security gaps due to open vulnerabilities, with the support from compliance auditors and CISO clout.

In order to understand what stands behind the "access request processing" step of the chain, we can look at the "access request processing" as a binary function resulting in either "GO" or "STOP" order. This function represents if the person performing the step ("actor") has rights to do so. We call these rights entitlements.

A person can get entitlements in the following ways:
- As a part of automatic provisioning, for example, birthright roles, which assigned to an identity during onboarding based on person attributes, like title, department, manager, etc.
- By requesting them via company's access request system, like ITSM or Identity Governance product
- By asking entitlement owners directly or indirectly (for example, via manager) outside of standard process
- By mistake, negligence or fraudulent actions A person can be denied entitlement based on:
- Written IT Security policies and rules due to possible violation or toxic combination, like person with "account payable" entitlement cannot have "account receivable".
- Unwritten company policies, i.e., "company culture traditions", for example, only senior managers can access the executive's floor
- By mistake, ignorance or broken approval or exception handling process This means that "access request processing" result is a direct corollary of access request processing, which can be represented as function. This function takes several sets as arguments: access request processing content (asset name, action name) and context (requestee and requester identity, roles and responsibilities, time and date of the request, geospatial location, end point device, IP, etc.), documentation on business needs and access policy/rules, approval workflows, etc.

Figure 6:
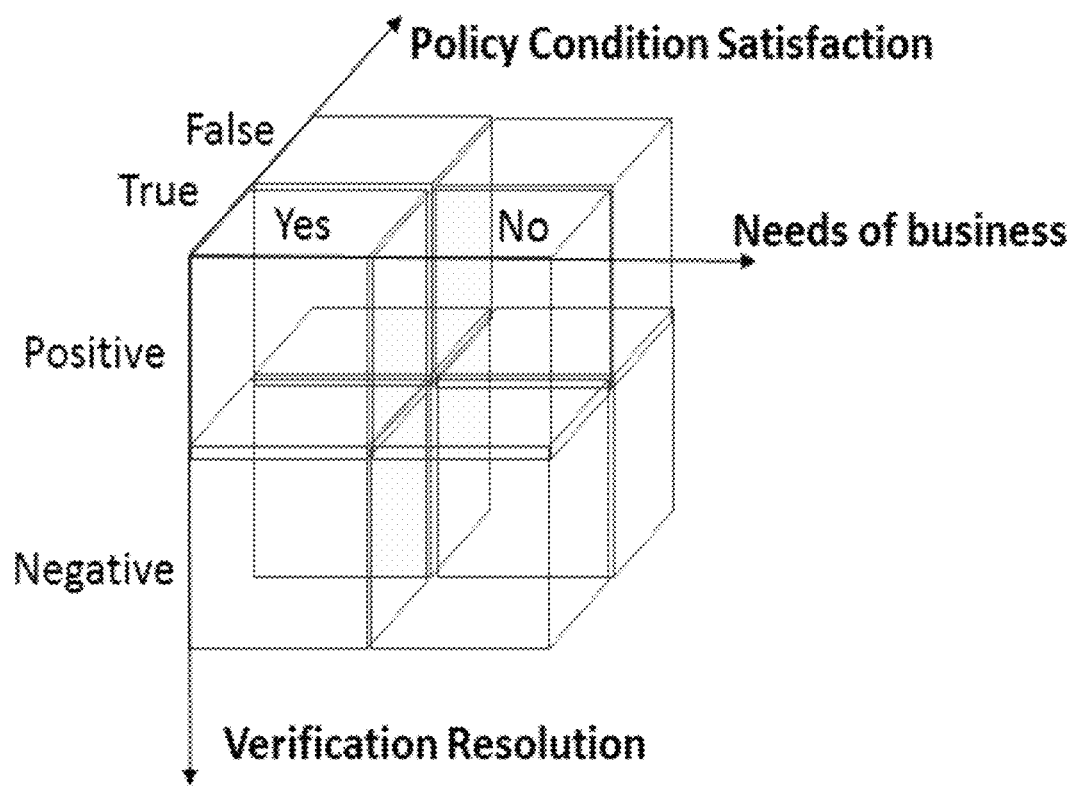
FIG. 6 illustrates a three-dimensional NPR cube model in accordance with embodiments of the present invention.

As a result, access request will end up in one of the eights octants of NPR cube with three binary values: if the request is a result of a proven business need (Yes or No, or Y and N), if the approval condition derived from access policy/rule set is met (True or False, or T and F), and the resolution directive (Positive or Negative, or P and N) as shown in FIG. 6.

Thus, in accordance with embodiments of the present invention, the access governance NPR cube has the following three axes. 1) X-axis: Needs of Business with values Yes and No (Y and N). Business need value usually derives from the activities, organizational structure, project assignment and business roles of the individual. Each person in the enterprise performs certain functions, which require ability to perform a set of actions on the set of assets, i.e., entitlements. The best practice recommends assigning business entitlements to the business roles and assign identities to such roles either automatically or manually. 2) Y-axis: Policy Condition Satisfaction with values True and False (T and F). Policy Condition value represents the result of applying business polices, rules and regulations to the content and context of the request. If company follows allow list policy strategy, then the value is True only if the combination of request content and context corresponds to one of the written use cases; otherwise, it is False. For denial list policy strategy, it is opposite: False for written use cases and True for the rest of them. In real life, no policy can cover all the cases, that is why often designated people have to revisit and correct the policy condition values. 3) Z-axis: Access request processing Resolution with values Positive and Negative (P and N). Resolution value represents the output of access request processing function. In case of allowing to proceed, the resolution value is set to Positive (P). In case of denial to process, the resolution value is set to Negative (N). Ideally, the resolution value should correspond to policy condition value (P to T and N to F), but in certain cases due to error, deviation or exceptional handling, it is not the case. In some instances, more than two discrete values can be assigned to each axis. For example, the Needs axis can have three discrete values "High," "Medium" and "Low."

The system of the present invention is configured to collect the data associated with the IGA as discussed above in relation to FIG. 3 data flow diagram, and then classify the data and use the classified data to build a three-dimensional NPR cube model and perform a statistical analysis in accordance with the following methods of the present invention. While the NPR cube as shown in FIG. 6 has six faces, the following discussion will concentrate on XY-, YZ- and XZ-planes.

Figure 7:
FIGS. 7-9 illustrate the surfaces for analyzing the three-dimensional NPR cube model of FIG. 5 in accordance with the methods of the present invention.

In accordance with the method of the present invention, as illustrated in FIG. 7, XY-plane face (Business-Policy) is defined as Governance Surface. It represents the way governing body and governance-related individuals will see access request processing function. It has four quadrants: YT represents business need+compliance to policy conditions. It means "GO" from the governance standpoint; YF represents business need+breaking policy conditions, which means "Exception" from the governance standpoint; NT represents no business need+compliance to policy conditions, which means "Vulnerability" from the governance standpoint; and NF represents no business need+breaking policy conditions, which means "Stop" from the governance standpoint.

Figure 8:
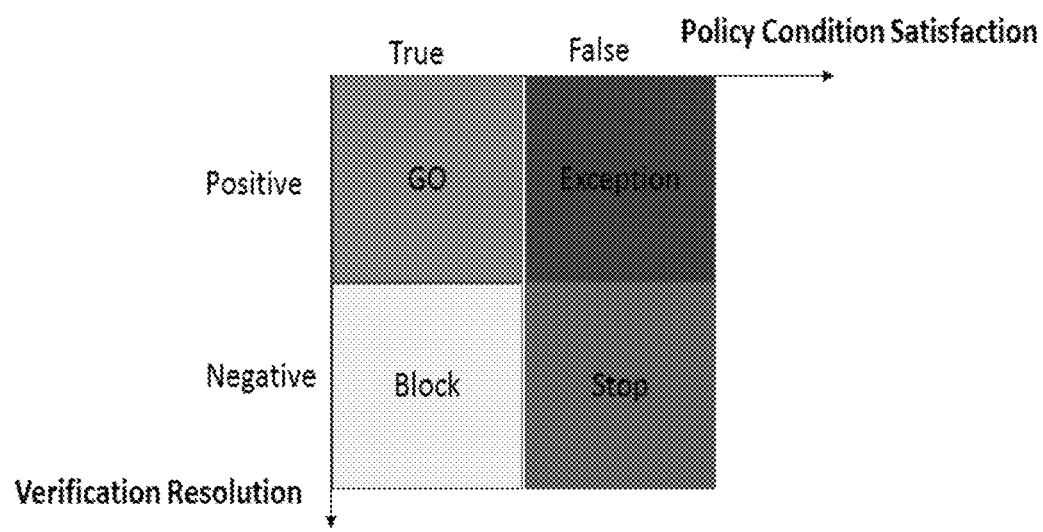

In accordance with the method of the present invention, as illustrated in FIG. 8, YZ-plane face (Policy-Resolution) is called Operations Surface. It has four quadrants: TP represents compliance to policy conditions+OK to proceed, which means "GO" from the operations standpoint; TN represents compliance to policy conditions+deny to proceed, which means "Block" from the operations standpoint (e.g., something went wrong during the access request processing such as possible bug or malfunction); FP represents breaking policy conditions+OK to proceed, which means "Exception" from the operations standpoint (usually someone allowed exception for business reasons); and FN represents breaking policy conditions+deny to proceed, which means "Stop" from the operations standpoint.

Figure 9:
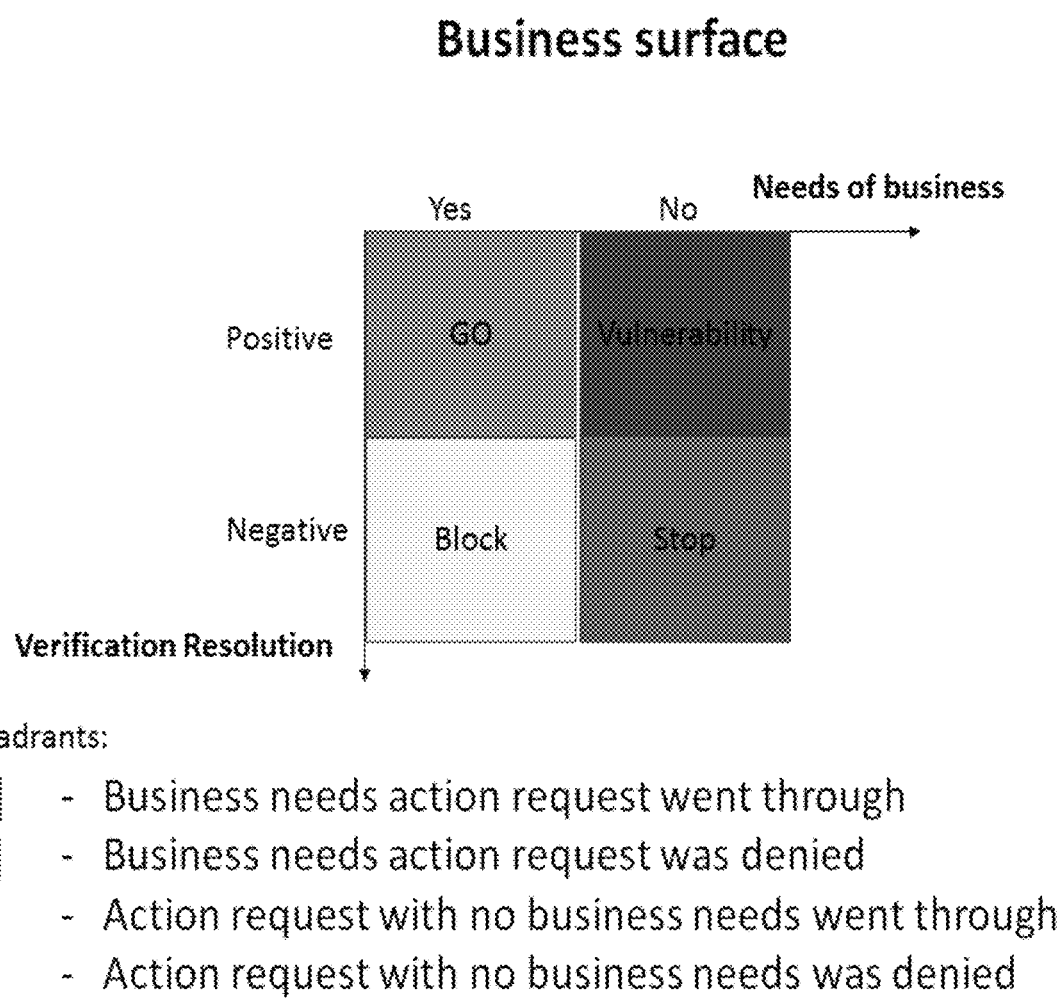

In accordance with the method of the present invention, as illustrated in FIG. 9, XZ-plane face (Business-Resolution) is called Business Surface. It represents the way business management and users will see access request processing function. It has four quadrants: YP represents business need+OK to proceed, which means "GO" from the business standpoint; YN represents business need+denial to proceed, which means "Block" from the business standpoint and requires further investigation and adjustments; NP represents no business need+OK to proceed, which means "Vulnerability" from the business standpoint, raising the question how it happened and requires adjustments in resolution process; and NN represents no business need+denial to proceed, which means "Stop" from the business standpoint.

With reference to FIGS. 10-20, there follows a detailed discussion of the NPR cube octants and their characteristics in accordance with the methods of the present invention. Every access request processing is placed into one of the 8 octants depending on values of business needs (Y or N), policy condition (T or F) and resolution (P or N). Each octant, relationship with cube surfaces, type of request landing there and some other characteristics related to these octants can be described as follows.

Figure 10:
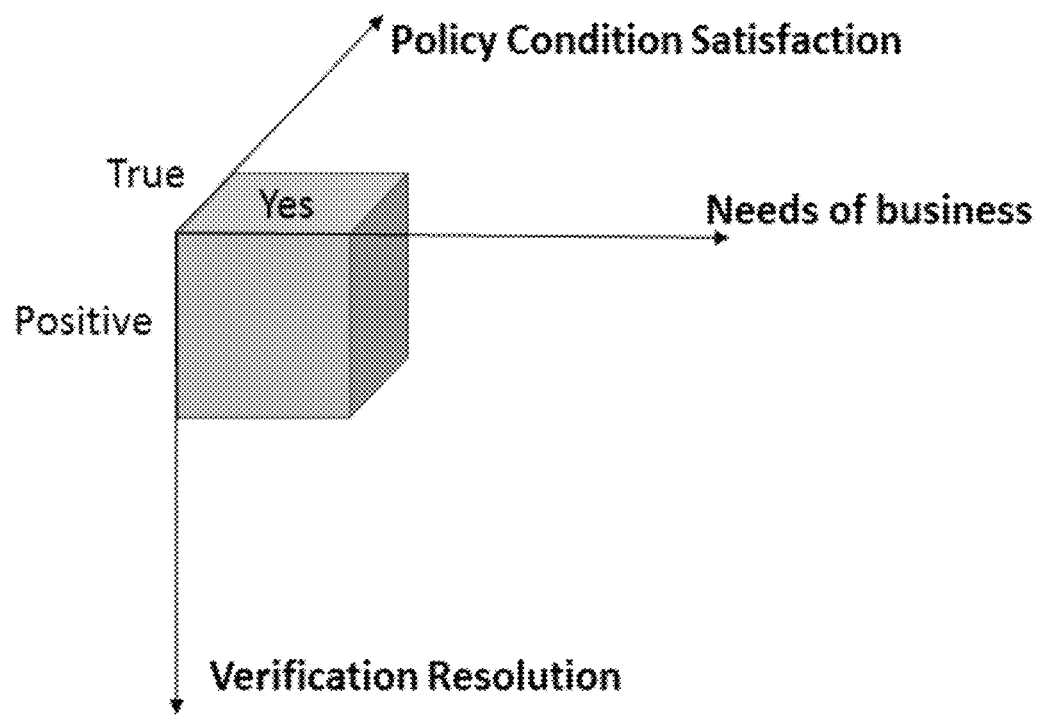
FIGS. 10-21 illustrate the octants for analyzing the three-dimensional NPR cube model of FIG. 5 in accordance with the methods of the present invention.

As illustrated in FIG. 10, YTP is defined as the collection of all the access request processing with proven business needs, satisfied policy conditions and positive resolution. This octant has three surfaces: YT, TP and YP. All of them are "All GO", hereinafter referred to as "GO" Octant. This octant has the following characteristics: every access request processing in the octant will result in executing next step in user chain access; lowest Costidity per each request from all other octants; moderate risk; low level of deviation; and fastest processing per request.

Figure 11:
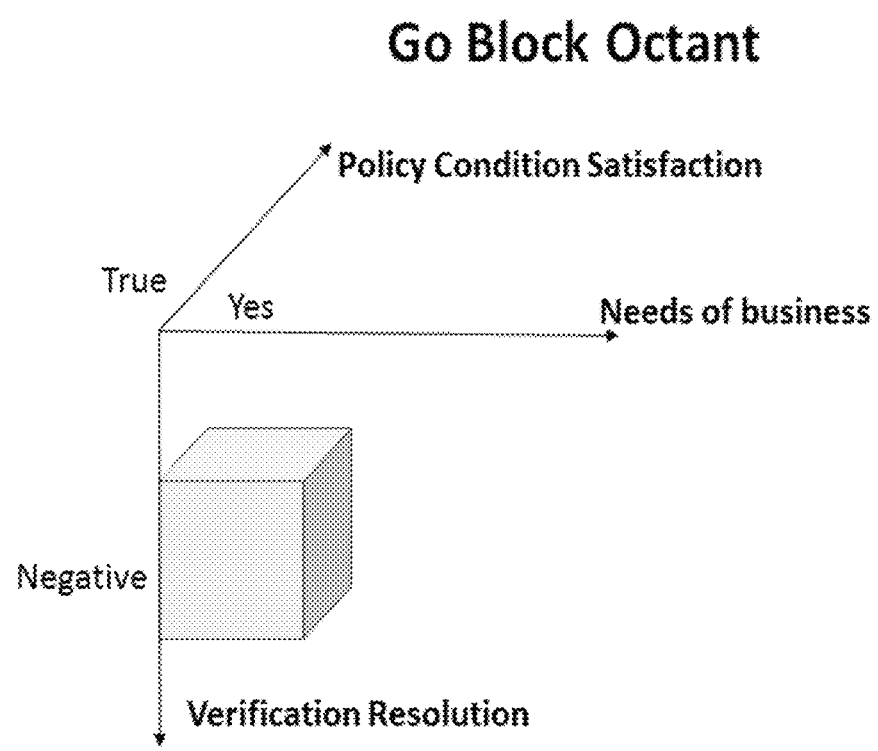

As shown in FIG. 11, YTN is defined as the collection of all the access request processing with proven business needs, satisfied policy conditions, but with negative resolution ("denied action"). This octant has three surfaces: YT, TN and YN. One is "GO", two are "Block". This octant can be defined as "GO Block". Each access request processing ended up here shows incompleteness of policy condition and possible error in resolution calculation implementation. One needs to research each case and update both policy conditions and resolution determination algorithm. The system of the present invention is configured to issue an alert associated with each access request processing located in this octant. The following are the "GO Block" octant characteristics: every access request processing in the octant will result in either exceptional approver step or resubmitting request after updating policy conditions and resolution program; high Costidity per each request; low risk; high level of deviation; and longest processing time per request.

Figure 12:
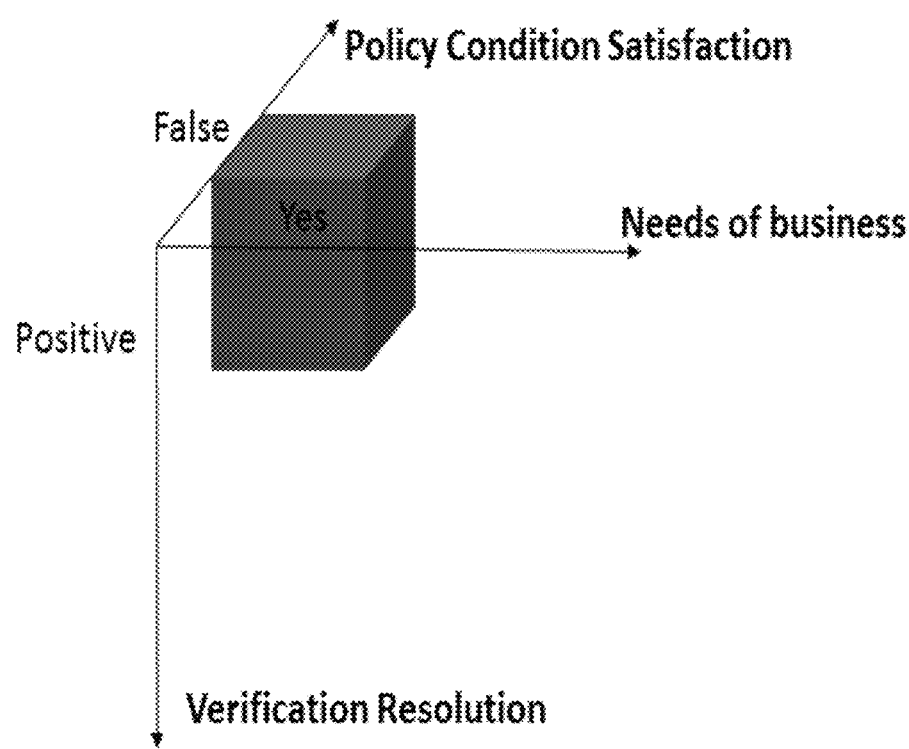

As shown in FIG. 12, YFP is defined as collection of all the access request processing with proven business needs, not satisfied policy conditions, but with positive resolution ("GO"). This octant has three surfaces: YF, FP and YP. Two are "Exception" and one is "GO". This octant is called as "Exception GO". Each access request processing ended up here is under either written or manually approved exception not entered into policy condition and taken into resolution calculation implementation, or cause for security alert. One needs to research each case and update policy conditions and resolution determination algorithm. The system of the present invention is configured to issue an alert associated with each access request processing located in this octant. This octant has the following characteristics: every access request processing in the octant will result in executing next step in user chain access and possible security alert; low Costidity per each request; high risk; moderate level of deviation; and short processing time per request.

Figure 13:
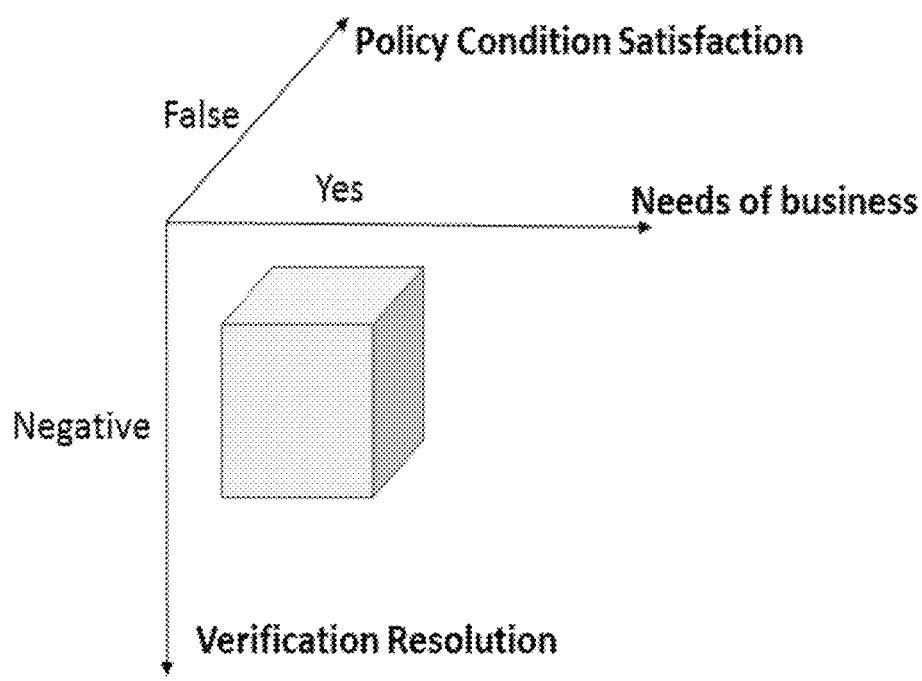

As illustrated in FIG. 13, YFN can be defined as the collection of all the access request processing with proven business needs, not satisfied policy conditions, and with negative resolution ("denied action"). This octant has three surfaces: YF, FN and YN. One is "Exception", one is "Stop" and one is "Exception". This octant can be called the "Exception Stop". Each access request processing ended up here shows miscommunication between business and security. This causes users to scramble and find another way to do their job, which creates many deviations. One needs to research each case and either convince business to change current process or update both policy conditions and resolution determination algorithm. The system of the present invention is configured to issue an alert associated with each access request processing located in this octant. This octant has the following characteristics: every access request processing in the octant will result in either exceptional approver step or resubmitting request after either updating business process or updating policy conditions and resolution program; highest Costidity per each request; moderate risk; highest level of deviation; and longest processing time per request.

Figure 14:
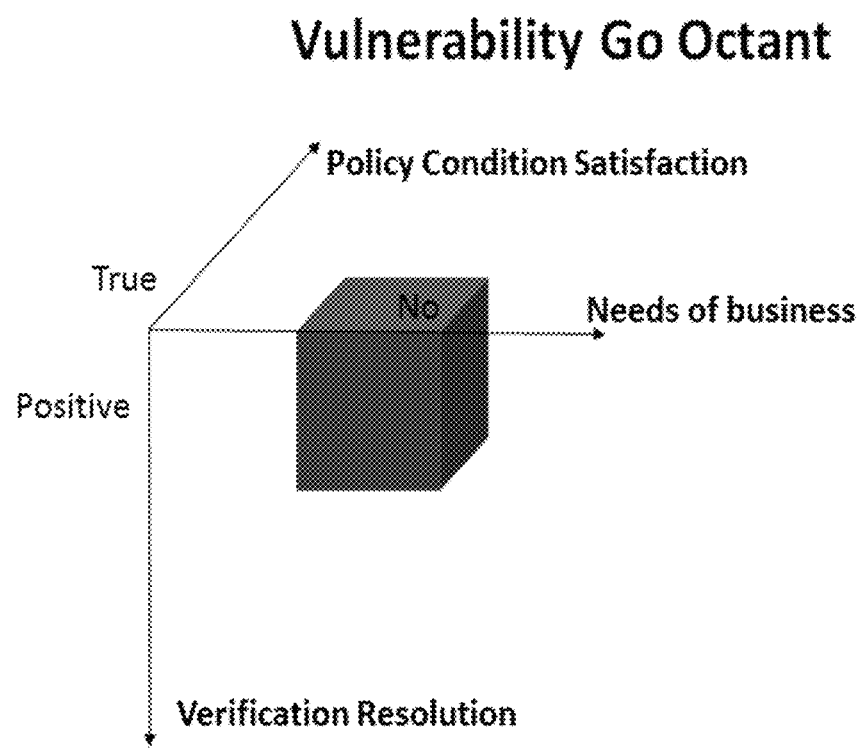

As illustrated in FIG. 14, NTP is defined as the collection of all the access request processing with no business needs, satisfied policy conditions and positive resolution. This octant has three surfaces: NT, TP and NP. Two is "Vulnerability" and one is GO", hereinafter referred to as "Vulnerability GO" Octant. Each access request processing ended up here shows security gap created by outdated or incorrect policy conditions. For each of these access request processing located in this octant, the system of the present invention is configured to create a high level alert on business level and to pass it to IT Security and compliance team for policy conditions adjustments and resolution determination algorithm changes if needed. This octant's characteristics are as follows: every access request processing in the octant will result in executing next step in user chain access; high Costidity per each request; the highest risk per each request among all octants; low level of deviation; and fast processing per request.

Figure 15:
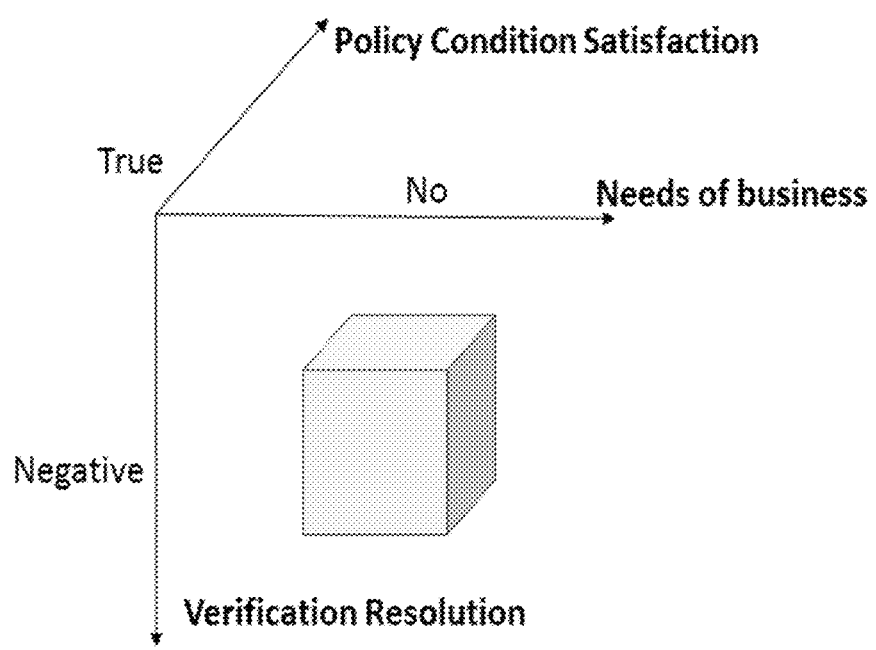

With reference to FIG. 15, NTN is defined as the collection of all the access request processing with no business needs, satisfied policy conditions, but with negative resolution ("denied action"). This octant has three surfaces: NT, TN and NN. One is "Vulnerability", one is "Block" and one is "STOP". We will call this octant as "Vulnerability Block". Each access request processing ended up here shows outdated policy condition not corresponding to current business needs. One needs to research each case and update policy conditions based on business requirements. There is also potential error in access request processing resolution algorithm since it produces negative answer on satisfying condition. The number of requests in this octant clearly shows the maturity of policy condition management. The system of the present invention is configured to issue and send an alert associated with each access request processing located in this octant to a business entity. This octant has the following characteristics: every access request processing in the octant will result in either exceptional approver step or resubmitting request after updating policy conditions and resolution program; moderate Costidity per each request; low risk; low level of deviation; and long processing time per request.

Figure 16:
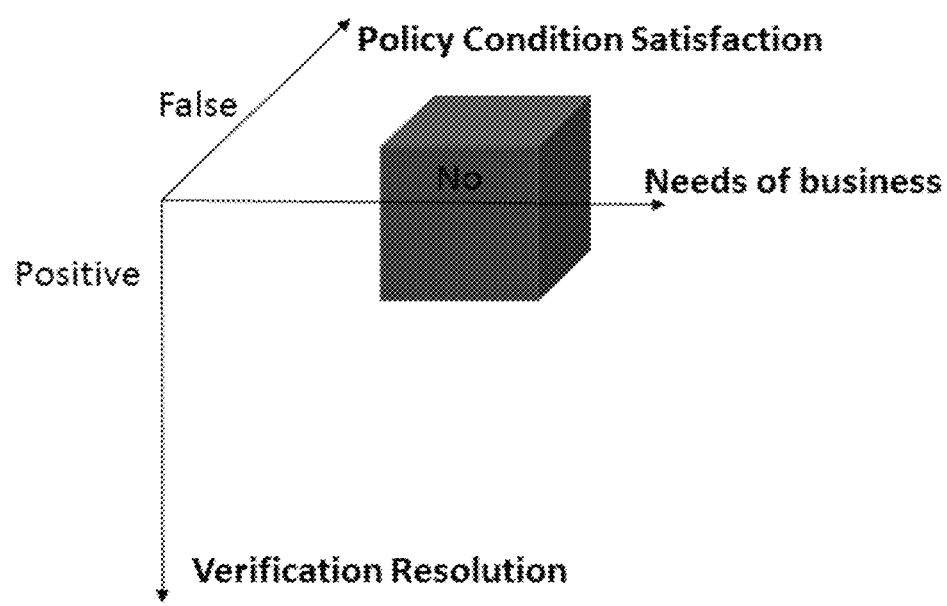

With reference to FIG. 16, NFP is defined as the collection of all the access request processing with no business needs, not satisfied policy conditions, but with positive resolution ("GO"). This octant has three surfaces: NF, FP and NP. One is "Stop", one is "Vulnerability" and one is "Exception". Hereinafter referred to as "Vulnerability Exception". Each access request processing ended up here is under either written or manually approved exception not entered into policy condition and taken into resolution calculation implementation, which must cause a security alert. Any access request processing ending up here should be a subject of serious review and high on the list of IT security. For sure, resolution algorithm needs to be updated. The system of the present invention is configured to issue and send an alert for each access request processing residing in this octant. This octant has the following characteristics: every access request processing in the octant will result in executing next step in user chain access and high security alert; low Costidity per each request; highest risk; indicates high level of deviation; and short processing time per request unless it is blocked by additional mechanisms.

Figure 17:
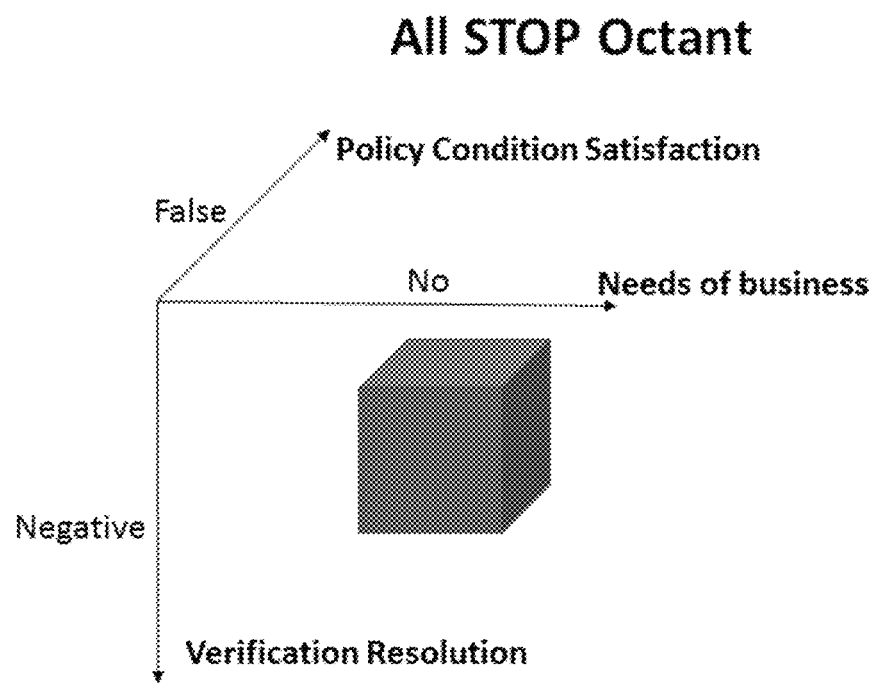

As illustrated in FIG. 17, NFN is defined as the collection of all the access request processing with no business needs, not satisfied policy conditions, and with negative resolution ("denied action"). This octant has three surfaces: NF, FN and NN. All of them are "Stop". This octant is hereinafter referred to as "All Stop". These requests will probably be reviewed by IT Security and likely exception will be denied. There is a direct correlation with organization maturity: higher the percent of all "no business needs" requests end up here the better IGA maturity is. This octant has the following characteristics: every access request processing in the octant will result in security review and exception denial; moderate Costidity per each request; low risk; moderate level of deviation; and low processing time per request.

Figure 18:
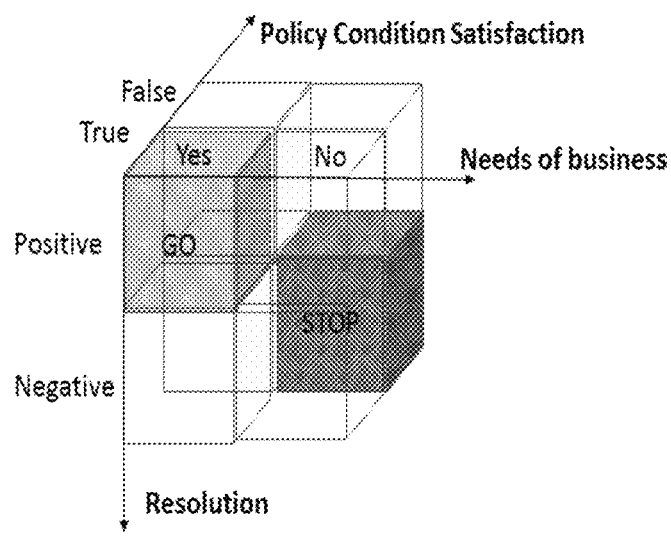

In accordance with the method of the present invention, the octants can be grouped together into the following categories, as illustrated in FIGS. 18-21. Referring now to FIG. 18, the first category is called the Mainstream, which includes "All GO" (YTP) and "All Stop"(NFN) octants. These two octants are preferred ones. In ideal situation, all of the actions request should end up there. Moreover, the maturity of the identity governance directly correlates to the percent of request in these octants. Both are characterized by low Costidity and fast processing time.

Figure 19:
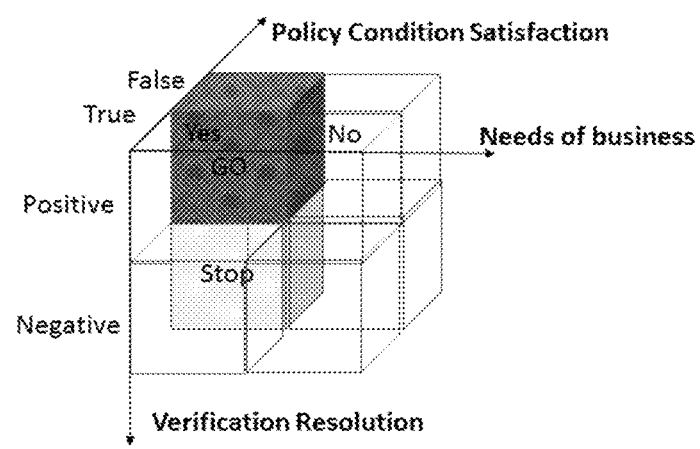
Figure 19:

The second category is the Exception, which includes "Exception GO" (YFP) and "Exception Stop" (YFN) as shown in FIG. 19. Both of these octants are for cases when there is a business need, but current policy conditions put this action in violation category. All of them will create exceptions, some of which could be allowed ("Go") and some of them not ("Stop"). This particular category creates the majority of deviation case, and correspondingly, most of Costidity. High number of access request processing in this category indicates serious rift between security policies and business operations, which takes extra time for request processing, exception cases mitigation and management costing organization substantial amount of money. The system of the present invention is configured to issue and send an alert to a business entity to perform thorough analysis of each case followed by adjustment of business practices and security policies.

Figure 20:
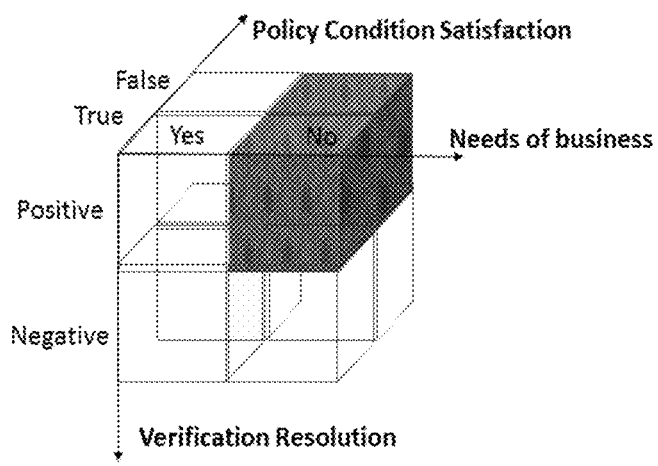

The third category is the Vulnerability, which includes "Vulnerability Go" (NTP) and "Vulnerability Exception" (NFP) as illustrated in FIG. 20. Both of these octants are for cases where despite no business need, action permission was granted. These actions do not necessary will create security alert, especially if they are in "Vulnerability Go" octant. This category cases should be high on IT Security list. High number of access request processing in this category indicates break in top-down information stream coming from business to policy makers and enforcers and creates serious security gaps raising the cyber risk. The system of the present invention is configured to generate and send to a business entity an alert associated with high number of access request processing in this category.

Figure 21:
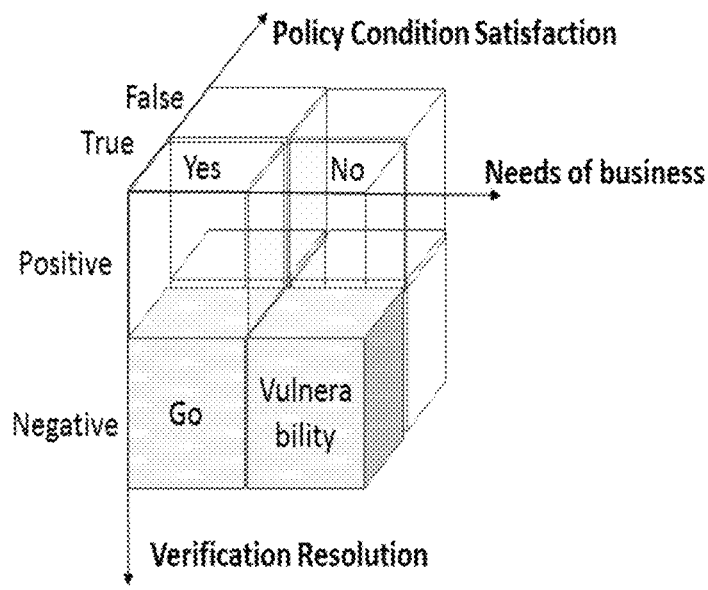

The fourth category is the Deviation, which includes "Go Block" (YTN) and "Vulnerability Block" (NTN) as shown in FIG. 21. Both of these octants are for cases where business needs are completely ignored and action was denied despite corresponding to policy conditions. These cases are breeding ground for high deviation along the lines of "I am not breaking any policy, my request is denied, so let me find another way of performing the same action." This category cases should be high on Identity Governance team in combination with business and whoever is in charge of access request processing resolution implementation. The combination of "*TN" indicates either the errors in logic or unaccounted by policy negative exceptions. Processing time of these requests are long, plus involvement of many players makes policy cost very high, i.e. high Costidity. At the same time, cyber risk is low due to "Stop" order. The system of the present invention is configured to generate and send to a business entity an alert associated with the cases from the Deviation category.

As discussed above, the system and related methods of the present invention provides a novel mechanism for monitoring, evaluating and analyzing the effectiveness and maturity of current access governance of an organization utilizing a novel three-dimensional NPR cube model. The system is configured to analyze data associated with the IGA and discover various trends, dependencies and irregularities, as well as to generate alerts that can be send to a business. Since every user process chain step execution creates data inside of the NPR cube for this particular (action, asset) pair, the system of the present invention is configured to find out many things, including: absolute and relative (i.e. percentage of total number) quantity of NPR cube calls for each octant per (action, asset) pair during the fixed time period (day, month, year, etc.); total time of user process chain execution, time per each step in the chain and its dependence on what NPR cube octant it hits during the access request processing step; approval/denial trends based on (action, asset) pair attributes and request context; possible patterns of user process chain steps depending on the previous step, i.e. how probable that next step access request processing ends up in a certain NPR cube octant based on previous step NPR cube octant location.

In order to discover the described-above trends, patterns and other information, the system of the present invention is configured to collect the following information from the organization. List of entitlements in the format of (action, asset) pair. For example: (Read Customer data, SalesForce); (Send email with attachments to external person, Outlook); (Manage access list to marketing folder, Active Directory Group "Marketing"). Log data on successful/unsuccessful user process chain steps and mitigation, like exceptional approvals: Identity Management logs for requesting/approving/denying access; Attestations; Operation logs related to assets, like SalesForce logs, STEM, log collections, etc. Typical user process chain information: policies and regulation document containing step-by-step process; subject matter expert interviews; any additional related information; Identity Governance workflow configurations and role assignments; approval workflows, etc. Timing information about execution of the user process chains and their steps can include Identity Management logs; Operations logs; and any additional related information. The described-above information can be generally grouped in two data types described in reference to the discussed-above data workflow illustrated in FIG. 3. To formalize and analyze all the information/data received by the system of the present invention from the enterprise, the following modeling definitions and terminology along with mathematical formulas are provided in accordance with the methods of the present invention.

Once the system of the present invention receives a full catalog of actions and assets from an organization, it is configured to index each catalog item by assigning to each items an index, unless each catalog item comes already indexed by an organization). The system is configured to create a combined list of pairs AA, where Aij corresponds to the action "i" applied to the asset "j". Suppose $\odot$ is the set of all octants with the following names: {YTP, YTN, YFP, YFN, NTP, NTN, NFP, NFN}. Let us define the following metrics:

Per $A_{ij}$ requests:

$Q(A_{ij},O,T)$=number of $A_{ij}$ access requests ended up in the octant $O\in\odot$ during the period of time T $N(A_{ij},O,T)$=ratio of number of $A_{ij}$ access requests ended up in the octant $O\in\odot$ over total number of $A_{ij}$ requests during the period of time T:

$$N(A_{ij}, O, T) = \frac{Q(A_{ij}, O, T)}{\sum_\odot Q(A_{ij}, O, T)},$$

where sum is by all $O\in\odot$

We define $Q(A_{ij},**P,T)$ as number of $A_{ij}$ access requests resolved positively during the period of time T.

$Q(A_{ij},**P,T)=Q(A_{ij},YTP,T)+Q(A_{ij},YFP,T)+Q(A_{ij},NTP,T)+Q(A_{ij},NFP,T)$

We define $Q(A_{ij},**N,T)$ as number of $A_{ij}$ access requests resolved negatively during the period of time T.

$Q(A_{ij},**N,T)=Q(A_{ij},YTN,T)+Q(A_{ij},YFN,T)+Q(A_{ij},NTN,T)+Q(A_{ij},NFN,T)$

Per j asset:

$Q(j,O,T)$=number of access requests related to j ended up in the octant $O\in\odot$ during the period of time T $N(j,O,T)$=ratio of number access requests related to j ended up in the octant $O\in\odot$ over total number of access requests related to j during the period of time T:

$$N(j, O, T) = \frac{Q(j, O, T)}{\sum_\odot Q(j, O, T)},$$

where sum is by all $O\in\odot$

We define $Q(j,**P,T)$ as number of access requests related to j resolved positively during the period of time T.

$Q(j,**P,T)=Q(j,YTP,T)+Q(j,YFP,T)+Q(j,NTP,T)+Q(j,NFP,T)$

We define $Q(j,**N,T)$ as number of access requests related to j resolved negatively during the period of time T.

$Q(j,**N,T)=Q(j,YTN,T)+Q(j,YFN,T)+Q(j,NTN,T)+Q(j,NFN,T)$

Total:

$Q(O,T)$=number of access requests in the octant $O\in\odot$ during the period of time T $N(O,T)$=ratio of number access requests in the octant $O\in\odot$ over total number of access requests during the period of time T:

$$N(O, T) = \frac{Q(O, T)}{\sum_\odot Q(O, T)},$$

where sum is by all $O\in\odot$

We define $Q(**P,T)$ as number of access requests resolved positively during the period of time T.

$Q(**P,T)=Q(YTP,T)+Q(YFP,T)+Q(NTP,T)+Q(NFP,T)$

We define $Q(**N,T)$ as number of access requests related to j resolved negatively during the period of time T.

$Q(**N,T)=Q(YTN,T)+Q(YFN,T)+Q(NTN,T)+Q(NFN,T)$

These numbers provide a very good picture around the maturity of identity and access governance and correspondence between business needs and IT security policies. For example, if during the last week there were 100 requests to do action "i" on asset "j", 60 of them were went through and 30 of them have proven business needs, satisfied policy conditions and resolved positively, then Q(A_ij,YTP,1 week)=30 and N(A_ij,YTP,1 week)=.3. This means that only 30% of all access requests went through directly according to business needs and business policies, and another 30% of all action requests went through either via exceptional approvals, extra steps or deviations. In any case, the maturity of the decision making around A ij is low, processing time of verification is longer than it could be, and Costidity (i.e., cost of governance and policy enforcement) is higher than it could be.

The system of the present invention is also configured to define the list of values for NPR cube similar to confusion matrix as described above. Now let us define the list of values for NPR cube similar to confusion matrix 0

$$\text{Positive Predictive Value } (PPV) = \frac{Q(P, T)}{Q(P, T) + Q(**N, T)}$$

$$\text{Negative Predictive Value } (NPV) = \frac{Q(N, T)}{Q(P, T) + Q(**N, T)}$$

$$\text{Business Needs Sensitivity} = \frac{Q(Y*P, T)}{Q(Y*P, T) + Q(N*P, T)}$$

$$\text{Business Needs Specificity} = \frac{Q(N*N, T)}{Q(Y*N, T) + Q(N*N, T)}$$

$$\text{Policy Condition Sensitivity} = \frac{Q(*TP,T)}{Q(*TP,T)+Q(*FP,T)}$$

$$\text{Policy Condition Specificity} = \frac{Q(*FN, T)}{Q(*TN,T)+Q(*FN,T)}$$

Business Needs False Positive Rate=1−Business Needs Specificity

Business Needs False Negative Rate=1−Business Needs Sensitivity

Policy Condition False Positive Rate=1−Policy Condition Specificity

Business Needs False Negative Rate=1−Policy Condition Sensitivity

We can calculate similar values per assets only by fixing value of j in the sum.

Note that there are two types of Specificity and Sensitivity due to octants vs. quadrants in confusion matrix. All of these rates are good indicators about policy efficiency of handling business needs, rate of exceptions for handling access request processing, rate of possible deviations and vulnerabilities. In accordance with the methods of the present invention, the same terminology and calculation principles can be applied to the whole user process chain by using transition matrices in addition to NPR cube values, similar to Markov Chains. Suppose user process chain has two consecutive actions: Aij and Akl. Transition matrix between step Aij and Akl represents the probability of one user process chain to have step Vij in octant O1 of Cij and step Vkl in octant O2 of Ckl, where O1 and O2 are one of the eight NPR cube octants. So, user process chain with N Aij actions will have N-1 8×8 matrices, and the rate of successful finishing the whole user chain will be calculated by multiplication of submatrices corresponding to positive outcome on each step.

The system of the present invention is configured to assess risk, vulnerabilities, deviation and cost of applied policies and business needs related to a specific action as follows. Access governance risk lies in abuse and misuse of granted access and directly depends on three factors: how comprehensive and current access policy is according to business needs, how privileged is the action and how valuable is the asset. In accordance with a method of the present disclosure the system can concentrate on the first out of three since policy rules should already include different handling of access depending on other too.

Access governance vulnerabilities lie in ability to perform actions on the asset despite contradicting IT security policy rules or business needs and often without triggering the security alert. For this, the system is configured to check NPR entrees in the following octants: NTP and NFP. For analyzing this, we will create the following calculated values: Business Need $$\text{Vulnerability Value} = \frac{Q(NTP, T)}{Q(Y*P, T) + Q(N*P, T)}$$

It shows the ratio of no business needs action requests with satisfied policy conditions and positive resolution over total number of positive resolution requests. This particular value reflects the percentage of granted entitlements on assets with no business needs and missed by policy and resolution control. These actions open door for excessive privileges, which could be either abused, misused or even hacked.

$$\text{Policy Condition Vulnerability Value} = \frac{Q(NFP, T)}{Q(*TP,T)+Q(*FP,T)}$$

It shows the ratio of no business needs access requests with failed policy conditions and positive resolution over total number of positive resolution requests. This particular value reflects the percentage of granted entitlements on assets with no business needs and failed policy conditions, but missed by resolution control. If this value is more than 0, then resolution controls should be checked, because these entitlement assignments look suspicious and need to be stopped by resolution process. It could be either the result of resolution algorithm bug or very high-level exception. Higher this value is, higher the vulnerability index and risks are. Each of these events should be high on the list of IT Security analysts. Each of these events should generate an alert from policy condition satisfaction module.

Access governance deviation lie in finding other ways to perform actions on the asset despite due to negative resolution of the access request processing via standard channel. For this, the system of the present invention is configured to to check NPR entrees in the following octants: YFN, YTN and NTN. For analyzing this, the system creates the following calculated values:

$$\text{Business Need Deviation Value} = \frac{Q(Y*N, T)}{Q(Y*N, T) + Q(N*N, T)}$$

It shows the ratio of business needs access requests with satisfied or non-satisfied policy conditions and negative resolution over total number of negative resolution requests. This particular value reflects the percentage of denied entitlement assignment on assets with business needs, which creates trend of getting around the defined process to do the job. High value of this index shows low maturity of access governance model and definite miscommunication within the organization. Each access request in this category corresponds to real business blocking issue, which needs to be resolved in conversation between IT Security, compliance team and business.

$$\text{Policy Condition Deviation Value} = \frac{Q(*TN, T)}{Q(*TN, T) + Q(*FN,T)}$$

It shows the ratio of business needs/no business need access requests with satisfied policy conditions and negative resolution over total number of negative resolution requests. This particular value reflects the percentage of denied entitlement assignments on assets in general. In this case, this value shows the disparity between policy condition satisfaction and resolution process. In theory, true on condition should mean automatic positive resolution of the access request. High value of this index shows issues with resolution algorithm or some kind of prohibitive listing not accounted for during policy condition satisfaction check, i.e. low maturity in compliance implementation. It needs to be resolved between IT Security, compliance team and business on case-by-case base, especially ones in YTN octant.

The system of the present invention is also configured to analyze and derive the values which can help estimate Costidity associated with policy implementation and management utilizing the NPR Cube model. Unlike discussed-above vulnerability and deviation, Costidity accumulates in each NPR cube. The difference is where Costidity comes from. Here are the main principles for Costidity estimation and mitigation by improvement business needs definitions, clarification of policy conditions and updating resolution algorithm and its implementation.

Cost of any policy consists of the following components: policy creation, policy enforcement, policy handling and policy management. Policy creation cost is mostly measured in time: how much men hours does it take to create, edit, agree and sign off. Policy enforcement cost has both time and materials: implementors time, testing, going live along with hardware, office rent, etc. Policy enforcement also includes setting up and checking alerts. Policy handling cost comes from following up on alerts, resolving exception cases, closing gaps in policy conditions and proposing changes to policy itself based on operations. Again, it is time and materials. And finally, policy management cost comes from making decisions about future of policies based on operations data and changes in regulations and industry practices. It is mostly time.

As mentioned before, Costidity represents not the full cost of policy, but just the elements related to purely human factor after policy is implemented. It's about policy handling cost, specifically cost of exceptions and deviations. The system is configured to analyze each octant of the NPR Cube model as follows. Before estimating the quantitative Costidity value of access request process, the system is configured to establish several measurable figures: average number of hours to handle one policy exception (from requesting the exception to granting it)—EH; Software Workflow cost to be able to handle one policy exception (licenses to exceptional approvers and software development and monitoring for handling exception workflows)—EW; average number of hours to handle one policy deviation (from discovering through investigation and mitigation)—DH; Software Workflow cost to be able to handle one policy deviation (configuration and customization to software workflows for blocking similar deviations)—DW; number of policy exceptions handled—EN; number of deviations discovered and mitigated—DN. It should be noted that usually EH<DH and EW<DW—handling exceptions is faster and cheaper than deviations for many reasons. The biggest one is that exceptions are reported and deviations should be discovered. Thus, the total Costidity related to handling exceptions and deviations can be described with the following formula:

$$Costidity = EN*(EH+EW) + DN*(DH+DW)$$

Based on this formula, Costidity directly proportional to average cost of handling the exceptions and deviations and to number of exceptions and deviations. One cannot avoid both, but reducing the number of exceptions and deviations along with the average cost of handling them will help not only increase IGA maturity, but save some money along the way.

The system of the present disclosure can analyze the members of each octants and see how they add to total Costidity as follows. Main stream octants will add no cost since it is either full Go or full Stop. Exceptions octants (YF*) members are adding to Costidity as mostly exceptions and some deviations, especially in Exception Go octant—it's hard to determine by just analyzing the numbers if access was granted via legitimate exception handling process or via deviation. So, during time period T $$(EH+EW)*Q(YF*,T) < Costidity < (DH+DW)*Q(YF*,T)$$

Vulnerability octants (N*P) members represent the biggest security threat: person receives an access with no business needs. NTP octant case shows obvious deficiency of the policy and needs a thorough examination of existing policy and its implementation (DW).

NNP octant member represents clear deviation (DH+DW), so $$Costidity = DW*Q(NTP,T) + (DW+DH)*Q(NNP,T)$$

Deviation octants (*TN) members are the trickiest ones and require additional examinations. There is a potential cost, because every element of YTN octant clearly shows the issues with access fulfillment process which needs to be adjusted (IAM operations cost–DW) and every NTN case is a hint on potential malicious deviation using the clear gap in policy allowing no-business-need request to be approved. To mitigate this case, the system of the present invention is configured to generate and send an alert to a business, which should go over business policy and its implementation in IAM tool for closing the gap (business and IAM operations cost–DW). So, Costidity for this octant can be estimated between $$DW*Q(NTN,T) < Costidity < DW*(Q(NTN,T) + Q(YTN, T))$$

So, the total Costidity estimation during the time period T for access request looks like this:

$$Costidity\_min = (EH+EW)*(Q(YF*,T) + DW*Q(NTP, T) + (DW+DH)*Q(NNP,T) + DW*Q(NTN, T)$$

$$Costidity\_max = (DH+DW)*(Q(YF*,T) + DW*Q(NTP, T) + (DW+DH)*Q(NNP,T) + DW*(Q(NTN,T) + Q(YTN,F))$$

Figure 22:
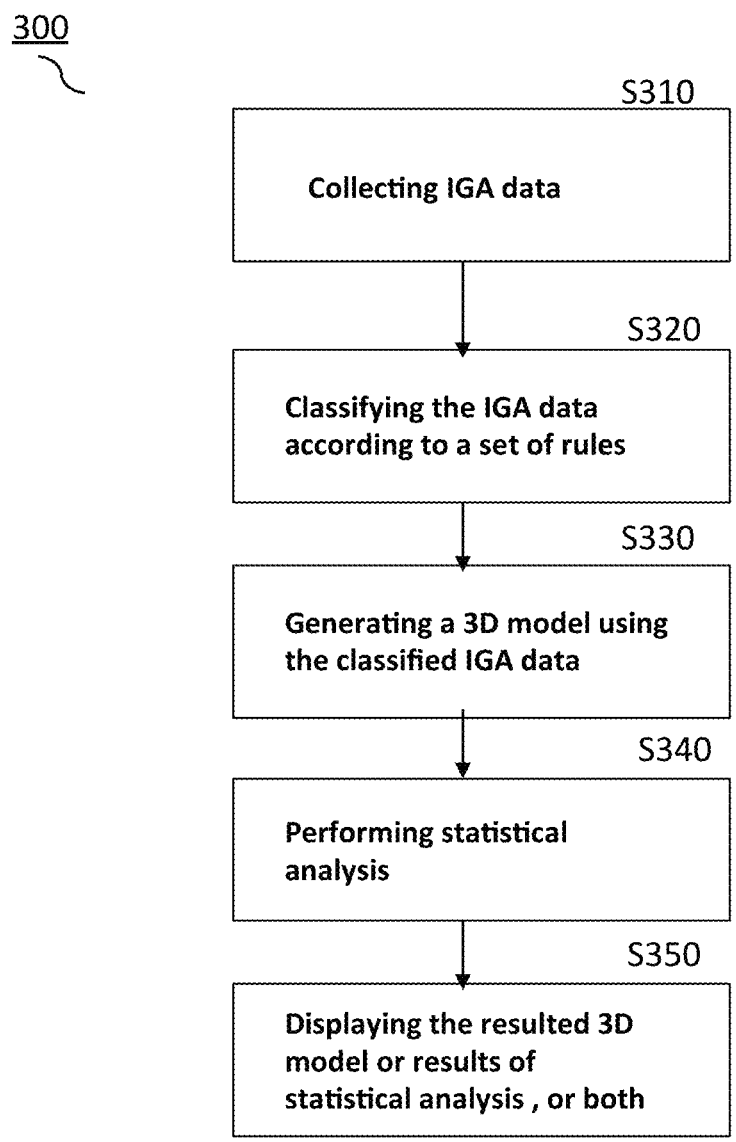
FIG. 22 is a workflow of the method of using the disclosed system in accordance with embodiments of the present invention.

According to an embodiment of the present invention, a system for managing, evaluating, monitoring and improving identity governance and administration (IGA) for an organization includes one or more processors and one or more memories with instructions (as discussed in detail in reference to FIGS. 1-2) that, when executed by the one or more processors, cause the one or more processors to execute method 300 of FIG. 22, the method includes the steps of collecting IGA data (step 210), classifying the IGA data according to one or more rules (step 320), generating a 3D model using the classified IGA data (step 330), performing statistical analysis (step 340) and optionally, displaying the resulted 3D model and/or results of the statistical analysis (step 350).

Figure 23:
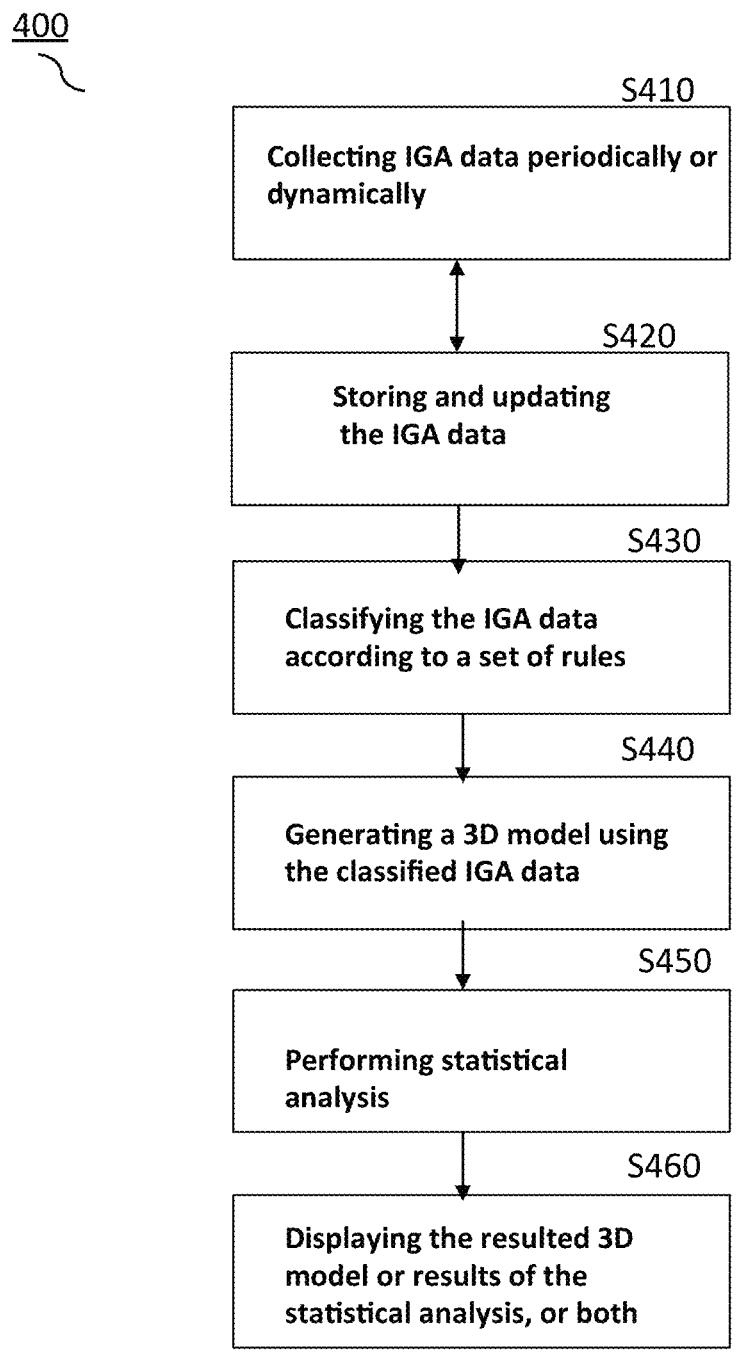
FIG. 23 is a workflow of the method of using the disclosed system in accordance with embodiments of the present invention wherein the data is periodically updated.

In some instances, as illustrated in FIG. 23, method 400 includes collecting IGA data either periodically at predetermined intervals (e.g., every two hours, or every six hours, etc.) or dynamically (continuously checking for new data) (step 410), storing and updating the IGA data (step 420), classifying the IGA data according to a set of rules (step 430), generating a three-dimensional model using the classified IGA data (step 440), and performing statistical analysis (step 450). In some instances, the method 400 also includes displaying the three-dimensional model and/or results of the statistical analysis (step 460). Updating a 3D model with periodically or dynamically updated data allows the system of the present invention to continuously monitor identity governance and administration (IGA) for an organization and generate and send one or more alerts associated with abnormalities, trends, discrepancies and other information discovered as a result of the statistical analysis using the NPR Cube model of the present invention.

According to the embodiments of the present invention, the data associated with the identity governance and administration can include history of digital assets access request by each person of an organization and entitlements assigned to each person of that organization. The step of classifying the data according to one or more rules can include the step of taking each digital assets access request and applying the queries: a) business need; b) compliance with the organization's policy; and c) resolution, assigning at least two discrete values to each query; and, in case of a positive resolution defined as the access request being granted, matching each request with a corresponding one or more entitlements person received as a result of request grant. The step of classifying the data according to one or more rules can also include a step of taking each entitlement not matched against digital assets access request, and applying the queries: a) business need; b) compliance with the organization's policy; and c) resolution.

In accordance with the disclosed method of the present invention, the step of building the three-dimensional model can include creating a cubic model using three axis, such as business need, policy and resolution as illustrated in FIG. 6. As discussed in detail above, in reference to FIGS. 7-20, the step of performing statistical analysis can include selecting a first subset of the cubic model and a second subset of the cubic model, and calculating percentage of total data points in the first subset against the total data points in the second subset. The second subset can be a full cube or a part of the full cube. In some instances, the step of performing a statistical analysis includes building the distribution function of data points associated with the digital assets access requests in time. It can also include a step of identifying one or more digital assets access requests having a combination of values pointing to one or more violations of the one or more rules.

According to some methods of the present invention, the data associated with business need includes a requested asset required for performing at least one task assigned to a person by the organization. The compliance with the organization's policy can include compliance with at least one policy governing access rules selected from prohibitive and permissive rules.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A method for managing, evaluating and improving identity governance and administration (IGA) for an organization, the method comprising:
    receiving, by a computing system, data associated with the identity governance and administration;
    classifying, by a computing system, the data associated with the identity governance and administration according to one or more rules, wherein classifying the data according to one or more rules comprises:
        taking each digital asset access request associated with a person and applying a first query associated with a business need, a second query associated with compliance with the organization's policy and a third query associated with resolution;
        assigning at least two discrete values to each of the first, second, and third query; and, in case of a positive resolution defined as the access request being granted, matching each request with a corresponding one or more entitlements the person received as a result of request grant;
    generating, by a computing system, a three-dimensional model using the classified data associated with the identity governance and administration; and
    performing, by a computing system, a statistical analysis.

2. A method according to claim 1, further comprising displaying, by a computing system, the three-dimensional model visualized as a three-dimensional cube with eight octants, or results of the statistical analysis, or both.

3. A method according to claim 1, wherein the data comprising:
    a. history of digital assets access requests by each person across the organization; and
    b. entitlements assigned to each person across the organization.

4. A method according to claim 1, wherein classifying the data according to one or more rules further comprising:
    taking each entitlement not matched against the digital assets access request; and
    applying the first, second, and third queries.

5. A method according to claim 1, wherein the three-dimensional model comprises a cubic model having three axes comprising a. business need, b. policy, and c. resolution.

6. A method of claim 1, wherein performing statistical analysis comprises:
    selecting a first subset of the cubic model and a second subset of the cubic model; and
    calculating percentage of total data points in the first subset against the total data points in the second subset.

7. A method of claim 6, wherein the second subset is a full cube or a part of the full cube.

8. A method of claim 1, wherein performing statistical analysis comprising:
    building the distribution function of data points associated with the digital assets access requests in time.

9. A method of claim 1, wherein the business need comprising:
    a requested asset required for performing at least one task assigned to a person by the organization.

10. A method of claim 1, wherein the compliance with the organization's policy comprising:
    compliance with at least one policy governing access rules selected from the group consisting of prohibitive and permissive rules.

11. A method of claim 1, wherein performing statistical analysis further comprising identifying one or more digital assets access requests having a combination of values pointing to one or more violations of the one or more rules.

12. A method of claim 11, further comprising generating an alert associated with the identified one or more digital assets requests for sending to the organization.

13. A method of claim 1, wherein receiving data is conducted periodically at predetermined times or dynamically as the data changes.

14. A system for managing, evaluating and improving identity governance and administration (IGA) for an organization, the system comprising:
    one or more processors; and
    one or more memories having stored thereon instructions that, when executed by the one or more processors, cause the one or more processors to:
        receive data associated with the identity governance and administration;
        classify the data associated with the identity governance and administration according to one or more rules, wherein classifying the data according to one or more rules comprises:

taking each digital asset access request associated with a person and applying a first query associated with a business need, a second query associated with compliance with the organization's policy and a thrid query associated with resolution;

assigning at least two discrete values to each of the first, second, and third query; and, in case of a positive resolution defined as the access request being granted, matching each request with a corresponding one or more entitlements the person received as a result of request grant;

generate a three-dimensional model using the classified data associated with the identity governance and administration; and perform a statistical analysis.

15. A system according to claim 14, wherein the data comprising:
   a. history of digital assets access requests by each person across the organization; and
   b. entitlements assigned to each person across the organization; and
      wherein the system is further configured to cause one or more processors to:
      display the three-dimensional model visualized as a three-dimensional cube with eight octants, or results of the statistical analysis, or both.

16. A system according to claim 14, wherein the three-dimensional model comprises a cubic model having three axes comprising a. business need, b. policy, and c. resolution.

17. A non-transitory physical computer storage medium, comprising computer-executable instructions that, when executed by one or more computing devices, configure the one or more computing devices to:

receive data associated with the identity governance and administration;

classify the data associated with the identity governance and administration according to one or more rules, wherein classifying the data according to one or more rules comprises:

taking each digital asset access request associated with a person and applying a first query associated with a business need, a second query associated with compliance with the organization's policy and a third query associated with resolution;

assigning at least two discrete values to each of the first, second, and third query; and, in case of a positive resolution defined as the access request being granted, matching each request with a corresponding one or more entitlements the person received as a result of request grant; and generate a three-dimensional model using the classified data associated with the identity governance and administration.

18. A non-transitory physical computer storage medium of claim 17, wherein performing statistical analysis comprising building the distribution function of data points associated with the digital assets access requests in time.

19. A non-transitory physical computer storage medium of claim 18, wherein performing statistical analysis further comprising identifying one or more digital assets access requests having a combination of values pointing to one or more violations of the one or more rules.

20. A non-transitory physical computer storage medium of claim 19, further comprising generating an alert associated with the identified one or more digital assets requests for sending to the organization.

* * * * *